United States Patent Office 3,809,718
Patented May 7, 1974

---

3,809,718
CROTONAMIDE DERIVATIVES SUITABLE AS AGENTS FOR CONTROL OF PLANT DISEASES
Ove Henning Mattsson, Taby, and Britt-Marie Elisabeth Bertilsson, Stockholm, Sweden, assignors to KemaNord AB, Stockholm, Sweden
No Drawing. Filed July 6, 1971, Ser. No. 160,196
Claims priority, application Sweden, July 7, 1970, 9,403/70
Int. Cl. C07c *103/60*
U.S. Cl. 260—562 S          3 Claims

ABSTRACT OF THE DISCLOSURE

This invention pertains to new chemical compounds that are suitable agents for the control of plant diseases carried by certain seed carrying bacteria. The new compounds are certain crotonamide derivatives.

---

THE PRESENT INVENTION

The present invention selates to new crotonamide derivatives which are suitable for the control of plant diseases caused by certain seed carried fungi. The new compounds have the general formula

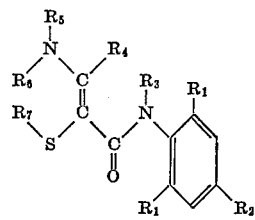

(I)

wherein:

$R_1$ and $R_2$ represent hydrogen, an alkyl, or alkoxy group having 1–6 carbon atoms, or halogen;

$R_3$, $R_4$, and $R_5$ represent hydrogen or an alkyl group having 1–6 carbon atoms, $R_6$ represents a saturated or an unsaturated alkyl group having up to 25 carbon atoms and the carbon chain may be interrupted by oxygen, sulfur, or nitrogen atoms and may contain hydroxy, mercapto, or amino groups, and $R_7$ represents hydrogen, an alkyl, or an hydroxyalkyl group having 1–6 carbon atoms or wherein $R_6$ and $R_7$ may in combination form an ethylene bridge between the sulfur and nitrogen atoms.

Examples of specific compounds falling within the scope of the General Formula I and showing a very good effect against pathogenic fungi, especially Ustilago by dressing of the seed, are compounds such as:

N-phenyl-2-(2-hydroxyethylthio) - 3 - methylamino crotonamide,
N-phenyl - 2 - (2-hydroxyethylthio) - 3 - propylamino crotonamide,
N-phenyl - 2 - (2 - hydroxyethylthio)-3-isopropylamino crotonamide,
N-phenyl - 2 - (2-hydroxyethylthio) - 3 - (2-aminoethylamino) crotonamide,
N-phenyl - 2 - (2 - hydroxymethylthio) - 3-isobutylamino crotonamide, and
2,3-dihydro-5-carboxanilido-6-methyl-1,4-thiazine.

More specifically:

The substituents $R_1$ and $R_2$ in the General Formula I may be straight or branched alkyl or alkoxy groups having 1–6 carbon atoms, such as methyl, ethyl, propyl or pentyl groups and methoxy, ethoxy, propoxy, or pentyloxy groups, respectively. Methyl groups are preferred.

In a preferred embodiment of the invention $R_3$ and $R_5$ represent hydrogen and $R_4$ represents methyl, but good results have also been obtained using compounds where $R_4$ represents an ethyl or a propyl group.

$R_6$ as set forth above may be a saturated or an unsaturated alkyl group including a straight or branched alkyl, alkenyl, or alkynyl group. As representative examples of alkyl groups there may be mentioned: ethyl, propyl, isopropyl, butyl, isobutyl, octyl, 2-ethylhexyl, decyl, cetyl, and stearyl groups. The unsaturated groups mainly consist of low molecular ethylenically or acetylenically unsaturated groups, such as allyl or propargyl groups, but higher homologues may also be used, for example oct-7-enyl or undec-10-enyl groups. The saturated or unsaturated groups may also be interrupted by oxygen, sulphur, or nitrogen atoms. Examples of such groups include: isopropoxy propyl, isobutyloxypentyl groups or compounds of the type $-(CH_2)_3-NH-R$, where R represents an alkyl group having 14–20 carbon atoms. The saturated or unsaturated alkyl groups may also contain hydroxy, mercapto, or amino groups, such as 2-aminoethyl, 2-aminopropyl, or 2-hydroxyethyl groups.

The $R_7$ group consists of a hydrogen atom, an alkyl group or a hydroxyalkyl group having 1–6 carbon atoms. Preferably, $R_7$ represents a 2-hydroxyethyl group.

2,3 - dihydro - 5 - carboxanilido-6-methyl-1,4-thiazine is an example of a compound wherein $R_6$ and $R_7$ in combination constitute an ethylene bridge between the sulfur and nitrogen atoms.

METHOD OF PREPARATION

The compounds according to the invention may be prepared under alkaline conditions by reacting a thiol or hydrogen sulphide with an α-chloroacetoacetanilide or derivatives thereof (II) (Naik, Trivedi and Mankad, J. Indian. Chem. Soc. 20 page 345 (1943), or Bulow and King, Ann. 439 page 211 (1924), thereby obtaining a N-aryl - 2 - (2 - alkylthio)-3-oxo crotonamide or a derivative thereof (III). (III) is thereafter reacted with an amine, thereby obtaining compounds having the General Formula I. The reactions are illustrated in the following reaction schedule, wherein $R_1$–$R_7$ are as defined above.

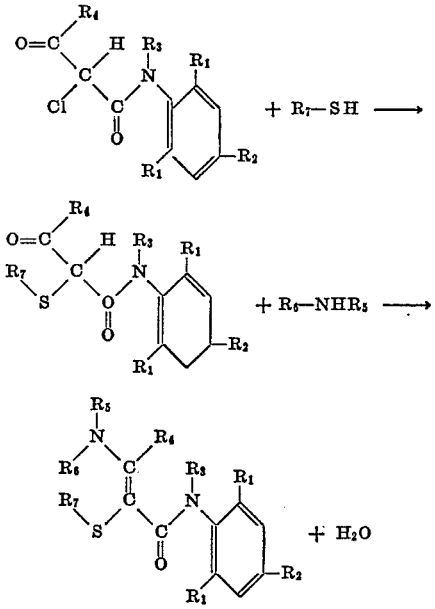

An alternative method for preparing certain compounds according to the present invention includes causing 2,3- dihydro - 5 - carboxanilido - 6 - methy 1- 1,4 - oxathiin or derivatives thereof to react according to the following reaction schedule ($R_1$–$R_7$) are as defined above).

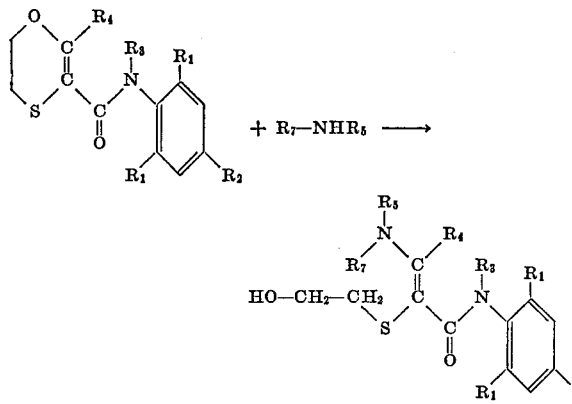

ADMIXTURE WITH ADDITIVES AND CARRIERS

To the compounds according to the invention there may be added carriers for every suitable application form. They can also be mixed with other compounds having fungicidal properties. When preparing sprayable solutions the compounds may be mixed with mineral oil fractions having a high to medium high interval for the boiling points or may be mixed with oils of animal or vegetable origin or with hydrocarbons. It is also possible to use the compounds in aqueous forms, such as emulsion concentrates, pastes or hydrophilic powders for spraying. In such cases it may be suitable to use emulsifying agents or dispersing agents. Preferably, the compounds are being used in dry form as powder preparations, using for example talc, kaolin, bentonite, calcium carbonate, carbon or wood meal as solid carrier materials. In a well known manner the preparations may contain dispersing agents, adherents, wetting agents of ionic or nonionic type, etc. Additives such as solvents, dilutents, dispersing agents, wetting agents, or adherents may be added to the control agents. Also, they may be mixed with other control agents if desired.

USE OF THE NOVEL CROTONAMIDE DERIVATIVES

The compounds show good effect against several noxious fungi, etc. such as Ustilago and Tiletia and are preferably used as agents for seed-dressing. When the compounds are formulated as a powder preparation, said powder is mixed with the seed, for example in a rotary drum. In case treatment of the seed is desired in the form of a wet dressing, the active components are suitably dissolved in a medium containing an amine, such as a mono or a diamine having 2–20 carbon atoms. In order to obtain a good effect the dressing agents according to the invention should be used in amounts of 100–500 g. per 100 kg. of seed.

The invention is further illustrated in the following examples.

Example 1

4 g. of 2,3-dihydro-5-carboxanilide-6-methyl-1,4-oxathiin were dissolved in a 20 ml. of pentylamine. After standing for 5 days at room temperature the amine was distilled off to give a crystalline residue. Recrystallization from n-hexane gave 4.65 g. of N-phenyl-2-(2-hydroxyethylthio)-3-propylamine crotonamide having a melting point of 49–52° C.

Example 2

To a stirred suspension of 31.8 g. (0.141 mole) of α-chloroacetoacetanilide in 150 ml. of dry benzene was added dropwise a solution of 9.96 g. of potassium hydroxide, 6.6 ml. methanol and 11.1 ml. (0.15 mole) of mercapto ethanol over a period of 1 hr. at room temperature. After another hour the resulting potassium chloride was filtered off and the solvents were driven off. The residue was dissolved in benzene and washed with water until neutral. The benzene phase was dried and evaporated. A yellowish red oil of α-(2-hydroxyethylthio)-acetoacetanilide was obtained. 4 g. (17 mmoles) of the so formed α-(2-hydroxyethylthio)acetoacetanilide were dissolved in 25 ml. of benzene at 40° C. Catalytic amounts of p-toluensulphonic acid and 1.1 g. (20 mmoles) of propargylamine were added. The temperature was increased to 80° C. and after 3 hrs. the reaction mixture was cooled and washed with water. After removal of the benzene crystals of N-phenyl-2-(2-hydroxyethylthio)-3-propargylamino crotonamide (3.65 g. M.P. 115–118° C.) were obtained.

Example 3

3 g. of 2,3-dihydro-5-carboxanilido-6-methyl-1,4-oxathiin were dissolved in 15 ml. of ethylene diamine and maintained for 5 days at room temperature. The reaction mixture was poured onto 40 ml. of water and extracted with ether (3 x 15 ml.) and chloroform (1 x 10 ml.). The extracts were evaporated, and 2.2 g. of N-phenyl-2-(2-hydroxyethylthio) - 3- (2 - aminoethylamino) crotonamide were obtained (M.P. 116–119°).

Example 4

4 g. of 2,3-dihydro-5-carboxanilido-6-methyl-1,4-oxathiin were dissolved in 22 ml. of methylamine at −40° C. and the solution was placed in an autoclave (volume 470 ml.). The reaction mixture was maintained at room temperature under 3–4 for 6 days, whereafter excess amine was driven off. A yellow oil was obtained by crystallization from methanol-water giving 1.6 g. of N-phenyl-2-(2-hydroxyethylthio)-3-methylamino crotonamide (M.P. 80–82° C.).

Example 5

8 g. of sodium hydroxide (0.2 mole) were dissolved in 100 ml. of water and while cooling $H_2S$ was bubbled into the solution until saturation. 42.3 g. (0.2 mole) of α-chloroacetoacetanilide, dissolved in 300 ml. benzene-methanol (1:1), were added to the $H_2S$ solution over a period of 1 hr. while stirring and cooling. After another hour the reaction mixture was evaporated and the residue was crystallized from toluene, giving 20.0 g. of α-mercaptoacetoacetanilide having the M.P. 83–86° C. 4 g. of the thus obtained α-mercapto-acetoacetanilide were treated with 25 ml. of isobutyl amine for 4 days at room temperature, thereafter driving off excess amine. The residue was recrystallized from cyclohexane, whereby 4.42 g. of N-phenyl-2-mercapto-3-isobutylamino crotonamide were obtained (M.P. 90–92° C.).

Example 6

4 g. of 2,3-dihydro-5-carboxanilido-6-methyl-1,4-oxathiin were dissolved in 20 ml. of isobutyl amine. After 13 days at room temperature excess amine was distilled off and the residue was crystallized from cyclohexane, giving 4.45 g. of N-phenyl-2-(2-hydroxyethylthio)3-isobutylamine crotonamide (M.P. 89–90° C.).

Example 7

4 g. (18.9 mmoles) of α-chloroaceto-acetanilide were dissolved in 40 ml. of benzene together with 2.63 g. (18.9 mmoles) of triethyl amine and catalytic amounts of sodium hydroxide. 1.46 g. (18.9 mmoles) of cystamine were added while stirring. After 3 hrs. the solvent was distilled off and recrystallization from methanol-water gave 2.45 g. of 2,3-dihydro-5-carboxanilido-6-methyl-1,4-thiazin having a melting point of 149–152° C.

Example 8

3 g. of 2,3-dihydro-5-carboxanilido-6-methyl-1,4-oxathiin were dissolved in 20 ml. of commercial alkylamino propylamine in which the chain distribution of the alkyl group is the one typical of coco-nut oil. The mixture was left to react until all of the starting material had disappeared. Thin layer chromatography showed the presence of an amino adduct analogous to the previous example. The crude reaction mixture was useful as a fungicide.

In a manner similar to that described in Examples 1–8 the following compounds were prepared:

| Example | Compound | Melting point (° C.) |
|---|---|---|
| 9 | N-phenyl-2-(2-hydroxyethylthio)-3-ethylamino crotonamide. | 105–107 |
| 10 | N-phenyl-2-(2-hydroxyethylthio)-3-isopropylamino crotonamide. | 115–117.5 |
| 11 | N-phenyl-2-(2-hydroxyethylthio)-3-butylamino crotonamide. | 63–65 |
| 12 | N-phenyl-2-(2-hydroxyethylthio)-3-pentylamino crotonamide. | 49–52 |
| 13 | N-phenyl-2-(2-hydroxyethylthio)-3-allylamino crotonamide. | 59–60.5 |
| 14 | N-phenyl-2-(2-hydroxyethylthio)-3-(2-hydroxyethylamino) crotonamide. | 113–114 |
| 15 | N-phenyl-2-(2-hydroxyethylthio)-3-isopropoxyamino crotonamide. | (¹) |
| 16 | N-(o-chlorophenyl)-2-(2-hydroxyethylthio)-3-isobutylamino crotonamide. | (²) |
| 17 | N-(p-methylphenyl)-2-(2-hydroxyethylthio)-3-propylamino crotonamide. | 132–133 |

¹ The product was a colorless liquid having the following characteristic IR-bands: 3,400, 3,300, 2,970, 2,880, 1,585, 1,520, 1,440, 1,315, 1,230, 770 and 750 cm.⁻¹.

² The product showed the following NMR absorption δ 0.99 (6H, d., J=6 cps.; (CH₃)₂—CH), δ 1.82 (1H, m.; (CH₃)₂—CH), δ 2.40 (3H, s.; CH₃—C—N), δ 2.68 (2H, tr.; J=6 cps.; CH₂—S), δ 3.11 (2H; tr., J=6 cps. CH₂—NH), δ 3.75 (2H, tr., J=6 cps.; CH₂OH),

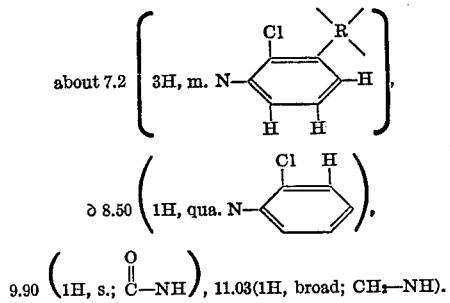

Example 18

0.5 kg. of oats were put into a big glass jar, thereafter 3 g. of spores of Ustilago avenae were added gently. Then the air was carefully evacuated from the jar and the latter was shaken vigorously in order to mix the oat grains and spores thoroughly. After this mixing procedure the stopper was rapidly removed from the jar, whereby the air streaming into the flask caused the spores to penetrate between the peel and the grain. The thus infected oat grains were used to test the crotonamide derivatives according to this invention.

100 infected oat grains were mixed with a quantity of uninfected grains of a different color to a total weight of 50 grams, and samples of this mixture were taken out and dressed with compounds according to the invention. The dressing of the seed was conducted by intimate mixing of the grains and the dressing formulations and the grains were left in contact with the formulations for 25 hrs. The thus dressed grains were thereafter allowed to grow between filter papers in Petri plates at 20° C. for 24 hrs.

After this period of time the grains were removed and peeled and then placed in a jar, 10 ml., and a diluted (1:2) Löffler's solution was added. The amount of solution is so calculated that 2 ml. was added to 50 grains. The jars were placed in a shaking apparatus and were vigorously shaken for about 5 min. whereby the spores were falling off the grains. The solution was sucked off and the number of germinated spores were visually determined through a microscope. As a reference a mixture of undressed fresh and infected grains was used.

In the table the fungicidal effect for typical examples of compounds falling within the scope of the General Formula 1 are given. The seed dressing was conducted as a dry dressing using of powder preparation containing 25 percent by weight of active substance and 75 percent by weight of talc as a carrier. The effect is given in percent of killed spores as compared to the control sample.

| Compound: | Effect (percent) |
|---|---|
| N-phenyl - 2 - (2-hydroxyethylthio)-3-isobutylamino crotonamide | 80 |
| 2,3 - dihydro - 5 - carboxanilido-6-methyl-1,4-thiazine | 60 |
| 2,3-dihydro - 5 - carboxanilido-6-methyl-1,4-oxathiin ¹ | 40 |

¹ This compound is a commercially available agent for control of plant diseases.

Example 19

The process according to the preceding example was repeated with the exception that the concentration of active substance in the composition for seed dressing was increased to 75%, which is the normally used amount in formulations of this kind. The following results were obtained:

| Compound: | Effect (percent) |
|---|---|
| N-phenyl-2-(2-hydroxyethylthio) - 3 - isopropylamino crotonamide | 100 |
| N-phenyl-2-(2-hydroxyethylthio) - 3 - isobutylamino crotonamide | 100 |
| N-phenyl - 2 - (2-hydroxyethylthio) - 3 - propylamino crotonamide | 80 |
| N-phenyl - 2 - (2-hydroxyethylthio) - 3 - methylamino crotonamide | 85 |

Those skilled in the chemical arts, and particularly in the art to which this invention pertains, will readily appreciate that many modifications of the basic invention set forth herein are possible. For example, it is quite possible that other closely related compounds might work as well as the herein specifically described compounds and there would certainly be no invention involved in trying such closely related compounds, in view of the present broad disclosure. All of these modifications are considered to be within the scope of the present claims by virtue of the well-established "doctrine of equivalents."

What we claim is:

1. A compound selected from the group consisting of

N-phenyl-2-(2-hydroxyethylthio)-3-methylamino crotonamide,

N-phenyl-2-(2-hydroxyethylthio)-3-propylamino crotonamide,

N-phenyl-2-(2-hydroxyethylthio)-3-isopropylamino crotonamide,

N-phenyl-2-(2-hydroxyethylthio)-3-(2-aminoethylamino) crotonamide,

N-phenyl-2(2-hydroxy-ethylthio)-3-isobutylamino crotonamide.

2. A compound having the formula

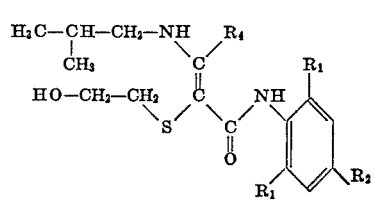

wherein:

$R_1$ and $R_2$ represent hydrogen, an alkyl, or alkoxy group having 1–6 carbon atoms, or halogen; and $R_4$ represents hydrogen or an alkyl group having 1–6 carbon atoms.

3. A chemical compound having the formula

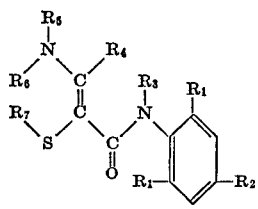

(I)

wherein:
$R_1$ and $R_2$ represent hydrogen, an alkyl, or alkoxy group having 1–6 carbon atoms, or halogen;
$R_3$, $R_4$, and $R_5$ represent hydrogen or an alkyl group having 1–6 carbon atoms,
$R_6$ represents a group selected from ethyl, propyl, isopropyl, butyl, isobutyl, octyl, 2-ethylhexyl, decyl, cetyl, stearyl, allyl, oct-7-enyl, undec-10-enyl, isopropoxypropyl, isobutyloxypentyl, 2-aminoethyl, 2-aminopropyl, 2-hydroxyethyl or $-(CH_2)_3-NH-R$ wherein R represents an alkyl group having 14–20 carbon atoms, and
$R_7$ represents hydrogen, an alkyl, or an hydroxyalkyl group having 1–6 carbon atoms.

References Cited
UNITED STATES PATENTS
3,635,997  1/1972  Tuepfi _____ 260—562

HARRY I. MOATZ, Primary Examiner

U.S. Cl. X.R.

260—562 N, 562 B, 327 P; 71—98